(12) United States Patent
Katsu (10) Patent No.: US 7,143,526 B2
(45) Date of Patent: Dec. 5, 2006

(54) METHOD FOR DRYING A CERAMIC FORMED BODY BY HOT AIR

(75) Inventor: Masanori Katsu, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 60 days.

(21) Appl. No.: 11/030,041

(22) Filed: Jan. 7, 2005

(65) Prior Publication Data
US 2005/0178022 A1  Aug. 18, 2005

(30) Foreign Application Priority Data
Feb. 16, 2004  (JP) ............... 2004-038126

(51) Int. Cl.
*F26B 7/00*  (2006.01)
(52) U.S. Cl. ............... 34/380; 34/437; 34/442; 34/487
(58) Field of Classification Search ............... 344/380, 344/437, 442, 443, 487
See application file for complete search history.

(56) References Cited

U.S. PATENT DOCUMENTS

| | | | | |
|---|---|---|---|---|
| 5,513,447 A | * | 5/1996 | Yoshida | .......... 34/491 |
| 5,914,187 A | * | 6/1999 | Naruse et al. | .......... 428/327 |
| 6,226,891 B1 | * | 5/2001 | Chapman | .......... 34/508 |
| 2003/0000663 A1 | * | 1/2003 | Geel | .......... 162/100 |
| 2005/0279693 A1 | * | 12/2005 | Katsu et al. | .......... 210/321.87 |

FOREIGN PATENT DOCUMENTS

JP  2001-130970  5/2001

* cited by examiner

*Primary Examiner*—S. Gravini
(74) *Attorney, Agent, or Firm*—Steptoe & Johnson LLP (57) ABSTRACT

There is provided a method for drying a ceramic formed body by hot air, the formed body having a peripheral face and end faces constituting a columnar shape, and at least one through-hole extending in an axial direction and open at the end face, the formed body containing ceramics and a heat-gelling binder. The hot air is blown to the formed body in a direction at an angle of 45 to 90 degrees with respect to the axial direction. The method can inhibit deformation such as a bending deformation or a torsional deformation generated in the ceramic formed body in the drying process and crack generation in the firing process after drying.

10 Claims, 13 Drawing Sheets

METHOD FOR DRYING A CERAMIC FORMED BODY BY HOT AIR

BACKGROUND OF THE INVENTION

1. Field of the Invention

The present invention relates to a method for drying a ceramic formed body by hot air.

2. Description of the Related Art

A honeycomb structure of ceramics is widely used for catalyst carriers and various filters. Recently, the honeycomb structure has gotten attention as a filter for trapping particulate matter exhausted from diesel engine (hereinafter referred to as DPF). In addition, a monolithic structure of ceramics is excellent in physical strength, durability, corrosion resistance, etc., and used, for example, for removal of suspended matter, bacteria, dust, or the like, present in liquid or gas in a field of a water treatment, an exhaust-gas treatment, pharmaceuticals or food. A honeycomb structure means a structure having a porous ceramic peripheral wall and through-holes separated from each other by porous ceramic partition walls disposed inside the peripheral wall. A monolithic structure means a structure having a porous ceramic substrate provided with a plurality of through-holes. Besides these structure, ceramic formed bodies each having at least one through-hole including a ceramic formed body of a tube structure with one through-hole have been spreading in various fields.

In general, a ceramic formed body having at least one through-hole is produced by the process of: adding a heat-gelling binder, water and other additives to a ceramic material to form mixed clay; forming a predetermined formed body out of the mixed clay by press, extrusion or the like; drying the formed body to gelate it; and firing it. However, in the above ceramic formed body, there arises a problem of deformation such as a bending deformation or a torsional deformation generated in the ceramic formed body in the drying process or a problem of crack generation in the firing process after drying. In particular, a honeycomb structure among ceramic formed bodies each having at least one through-hole sometimes has a structure in which a plurality of honeycomb structural segments are unitarily joined with each other. In this case, when a bending deformation or a torsional deformation is generated in some of the segments, it is difficult to join them together, and therefore, it is impossible to obtain a ceramic formed body having a precise configuration.

There has conventionally been known a method for drying a ceramic formed body, in which a microwave-drying step and a hot-air-drying step are combined with each other, as a method for rapidly drying a ceramic formed body with suppressing a bending deformation or the like upon drying. For example, JP-A-2001-130970 discloses a method in which a ceramic formed body is disposed so that the hot air can smoothly pass through the through-hole (i.e., the axial direction of the through-hole is parallel to the direction of the hot air) in order that moisture is vaporized as uniformly as possible in the hot-air-drying step.

However, it seems that such a drying method is not necessarily preferable as a means against the problem of deformation during drying or crack generation during firing though the method promotes drying inside the through-hole(s) by passing the hot air through the through-hole(s).

SUMMARY OF THE INVENTION

The present invention has been made in view of the aforementioned situation and aims to provide a method for drying a ceramic formed body, which hardly causes deformation such as a bending deformation and a torsional deformation during drying and hardly generates a crack in the subsequent firing step. As a result of repeated researches, it was found that even if hot air at a temperature higher than gelling temperature of the heat-gelling binder used is actively and directly sent in the though-hole(s), temperature of the hot air is lowered to the temperature lower than the gelling temperature of the heat-gelling binder in the through-hole(s) because of vaporization cooling of moisture, which suppresses gelling of the ceramic formed body having the through-hole(s), and as a result, deformation is caused by the weight of the ceramic formed body itself, thereby generating a crack in the subsequent firing step. Accordingly, it was found that the above aim may be achieved by employing a means in which hot air is neither actively nor directly passed through the through-hole(s), which lead to the completion of the present invention. The present invention is specifically as follows:

According to the present invention, there is provided a method for drying a ceramic formed body by hot air, the formed body having a peripheral face and end faces constituting a columnar shape, and at least one through-hole extending in an axial direction and open at the end face, the formed body containing ceramics and a heat-gelling binder, wherein the hot air is blown to the formed body in a direction at an angle of 45 to 90 degrees with respect to the axial direction (may be referred to as "the first drying method").

In the first drying method of the present invention, it is preferable that the direction of the hot air is parallel to a horizontal plane, and the ceramic formed body is disposed so that the axial direction of the through-hole is parallel to the horizontal plane.

In the first drying method of the present invention, it is preferable that the direction of the hot air is parallel to a horizontal plane, and the ceramic formed body is disposed so that the axial direction of the through-hole is at an angle of 45 to 90 degrees with respect to the horizontal plane.

In the first drying method of the present invention, it is preferable that the direction of the hot air is perpendicular to a horizontal plane, and the ceramic formed body is disposed so that the axial direction of the through-hole is at an angle of 0 to 45 degrees with respect to the horizontal plane.

In the first drying method of the present invention, it is preferable that the direction of the hot air is at an angle of 90 degrees with respect to the axial direction of the through-hole.

In the first drying method of the present invention, when the direction of the hot air is at an angle of 90 degrees with respect to the axial direction of the through-hole, it is preferable that the direction of the hot air is parallel to a horizontal plane, and the ceramic formed body is disposed so that the axial direction of the through-hole is at an angle of 0 to 90 degrees with respect to the horizontal plane.

In the first drying method of the present invention, when the direction of the hot air is at an angle of 90 degrees with respect to the axial direction of the through-hole, it is preferable that the direction of the hot air is parallel or perpendicular to a horizontal plane, and the ceramic formed body is disposed so that the axial direction of the through-hole is parallel to the horizontal plane.

Further, in the first drying method of the present invention, when the direction of the hot air is at an angle of 90 degrees with respect to the axial direction of the through-hole, it is preferable that the direction of the hot air is parallel to a horizontal plane, and the ceramic formed body is disposed so that the axial direction of the through-hole is perpendicular to the horizontal plane.

According to the present invention, there is provided a method for drying a ceramic formed body by hot air, the formed body having a peripheral face and end faces constituting a columnar shape, and at least one through-hole extending in an axial direction and open at the end face, the formed body containing ceramics and a heat-gelling binder, wherein a baffle plate is disposed between an upstream of the hot air and the end face having an opening of the through-hole (may be referred to as "the second drying method").

In the second drying method of the present invention, it is preferable that the direction of the hot air is parallel to the axial direction of the through-hole.

In the first and the second drying methods of the present invention, hot air is not directly passed through the through-holes. Therefore, temperature inside through-holes is not lowered to the temperature lower than the gelling temperature due to vaporization cooling of moisture, and vaporization of moisture in the ceramic formed body including a face forming through-holes and the vicinity thereof and gelling of the ceramic formed body sufficiently proceed. Thus, the methods have an excellent effect in inhibiting deformation due to weight of the ceramic formed body itself. In addition, there is no local temperature fall due to vaporization cooling, and drying inside the ceramic formed body is uniformly promoted. Accordingly, no strain is generated during drying, and a crack or the like is hardly generated during firing after drying.

BRIEF DESCRIPTION OF THE DRAWINGS

FIG. 11($a$) is a schematic view showing one example of a method for drying a ceramic formed body by hot air of the present invention;

FIG. 11($b$) is a schematic view showing one example of a method for drying a ceramic formed body by hot air of the present invention;

FIG. 11($c$) is a schematic view showing one example of a method for drying a ceramic formed body by hot air of the present invention;

DESCRIPTION OF THE PREFERRED EMBODIMENTS

Embodiments of the present invention are described in detail below with referring to the accompanying drawings. However, the present invention is not limited to the following embodiments. The following embodiments can variously be changed, modified, and improved based on the knowledge of a person skilled in the art without departing from the scope and spirit of the present invention. For example, though the drawings show preferable embodiments of the present invention, the present invention is not limited by the embodiments or information shown in the drawings. When the present invention is carried out or inspected, a similar means or the equivalent thereof as that described in the present specification may be employed. A preferable means is as follows:

First, description will be made on a ceramic formed body usable in the first and second drying methods of the present invention (also referred to as hot-air drying method as a general term). In a hot-air drying method of the present invention, an unfired ceramic formed body is dried by hot air. An unfired ceramic formed body for hot-air drying (1) contains ceramics and a heat-gelling binder, (2) has a columnar shape having a peripheral face and end faces, and (3) has at least one through-hole open at the end faces. Though the shape is described as a columnar shape, it is neither a cylindrical shape having an entirely hollow interior nor a columnar shape having an entirely stuffed interior. It may be said that an external shape is a columnar shape. There is no limitation to the size of the through-hole(s) and length of the columnar shape in the axial direction. Incidentally, "end faces" means external faces where the through-hole(s) is (are) open, and "a peripheral face" means an external face where the through-hole(s) is (are) not open, that is, the face other than the end faces.

There is no limitation to ceramic material and a heat-gelling binder contained in the ceramic formed body as described in (1). The ceramic formed body may contain, for example, a ceramic material containing alumina, zirconia, $Si_3N_4$, or SiC as the main component. In addition, "a heat-gelling binder" means an organic binder which gels when heated at a predetermined temperature (gelling temperature) or more. An example of such a binder is methyl cellulose.

An external shape of the ceramic formed body is not limited except for (2) and (3). A hot-air drying method of the present invention is suitable for drying a ceramic formed body having a honeycomb structure provided with fine and long through-holes, a ceramic formed body having a monolithic structure also provided with fine and long through-holes, and a tubular ceramic formed body having a long and narrow through-hole, addition to the configurations of (2) and (3). This is because these ceramic formed body is prone to have the conventional problems, that is, a bending deformation or a torsional deformation generated in the ceramic formed body in the drying process and a crack generated in the firing process after drying.

Figure 1:
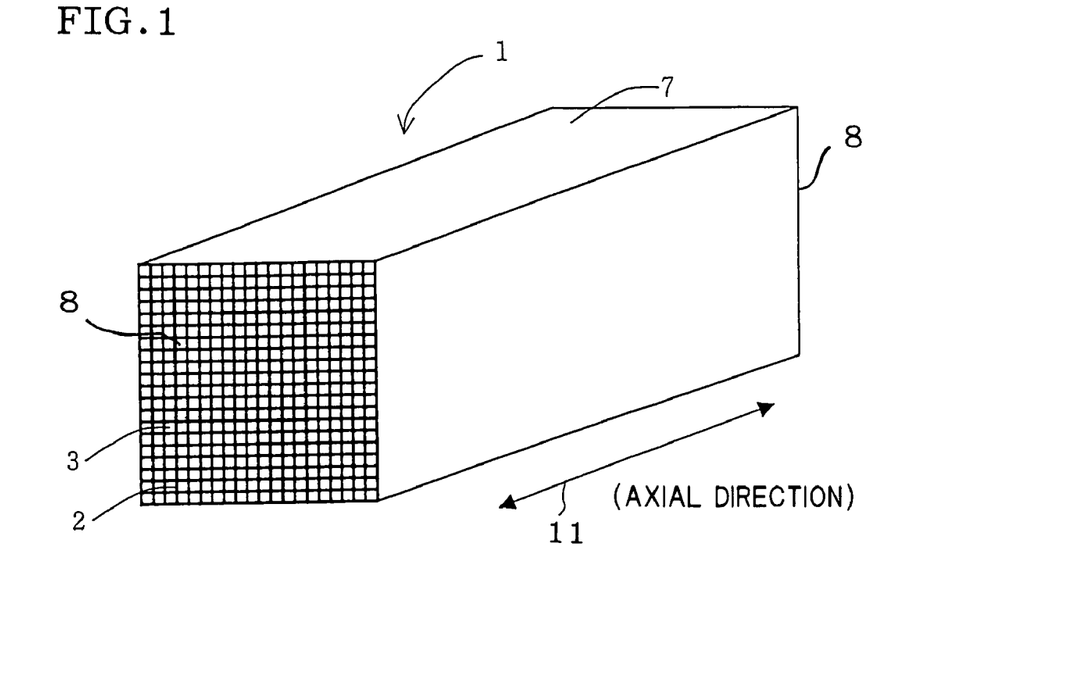
FIG. 1 is a perspective view showing one example of a ceramic formed body of the present invention.
Figure 2:
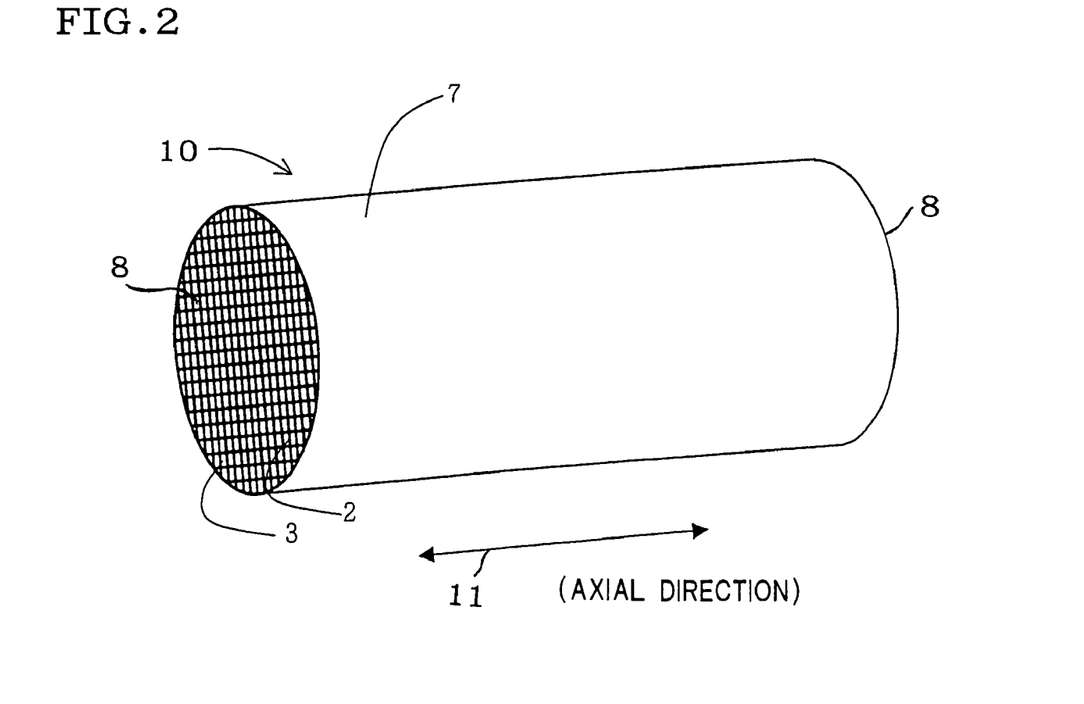
FIG. 2 is a perspective view showing another example of a ceramic formed body of the present invention.

FIGS. 1 and 2 are perspective views each showing a ceramic formed body having a honeycomb structure as an example of a ceramic formed body having at least one through-hole. The ceramic formed body shown in FIG. 1 has a square columnar shape, and the ceramic formed body shown in FIG. 2 has a circular columnar shape. Both has a columnar shape having a peripheral face 7 and two end faces 8. Both the ceramic formed bodies are provided with partition walls 2 disposed inside the peripheral face 7 and a plurality of through-holes 3 separated from one another by the partition walls and extending in the axial direction 11. The through-holes 3 are open at the end faces 8.

Next, description is made on the hot-air drying method of the present invention. In the hot-air drying method of the present invention, since hot air is inhibited from smoothly entering in the through-hole(s) open at end faces, temperature inside the through-hole(s) is hardly lowered to the temperature lower than the gelling-temperature due to vaporization cooling of moisture. Therefore, vaporization of moisture in a ceramic formed body including a face forming through-holes and the vicinity thereof and gelling of the ceramic formed body sufficiently proceed, and deformation due to the weight of the ceramic formed body itself and a crack during firing after drying are hardly caused.

Next, description is made on the first drying method of the present invention. FIGS. 4 to 10 are schematic views each showing a direction of sending hot air, an axial direction of a through-hole, and the angle formed by the directions with X, Y, and Z as coordinate axes. In FIGS. 4 to 10, an axial direction of a through-hole of a ceramic formed body 21 is expressed by an arrow 11 (referred to as "axial direction 11"), and a direction of sending hot air 4 (white arrow) is expressed by an arrow 14 (referred to as blowing direction 14) in each coordinates. The angle formed by the blowing direction 14 of hot air and the axial direction 11 is expressed by an angle $\theta$, and the angle of the axial direction 11 of a through-hole to a horizontal plane is expressed by an angle $\phi$. For convenience, X-Y plane is defined as the horizontal plane.

First, description is made on the first drying method of the present invention. In the first drying method of the present invention, a direction of sending hot air and an axial direction of a through-hole form an angle of 45 to 90 degrees with each other, that is, the angle $\theta$ is within the range from 45 to 90 degrees. This angle denotes the angle formed by a direction of sending hot air and an axial direction of a through-hole on the same plane and does not limit a direction of sending hot air or an axial direction of a through-hole (direction of disposing a ceramic formed body).

Figure 4:
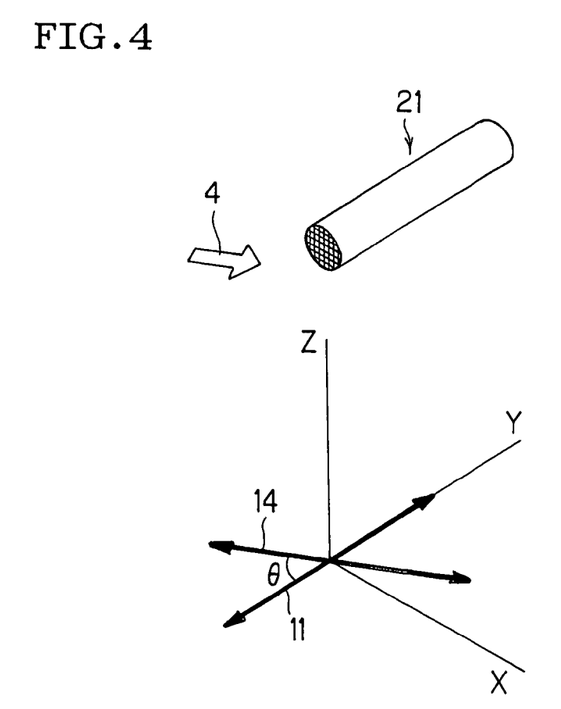
FIG. 4 is a schematic view showing one example of a method for drying a ceramic formed body by hot air of the present invention.

FIG. 4 shows a preferable embodiment of the first drying method of the present invention, in which the blowing direction 14 is present on the X-Y plane (parallel to the horizontal plane), the axial direction 11 of the through-holes is on the X-Y plane (parallel to the horizontal plane), and the ceramic formed body 21 is disposed so that the axial direction 11 of the through-holes corresponds to the Y-axis direction (parallel to the horizontal plane). In this case, the angle $\theta$ is expressed as an angle on the plane where both the blowing direction 14 of hot air and the axial direction 11 of the through-holes are present, that is, the X-Y plane, and is within the range from 45 to 90 degrees. The angle $\phi$ is 0 degree.

Figure 3:
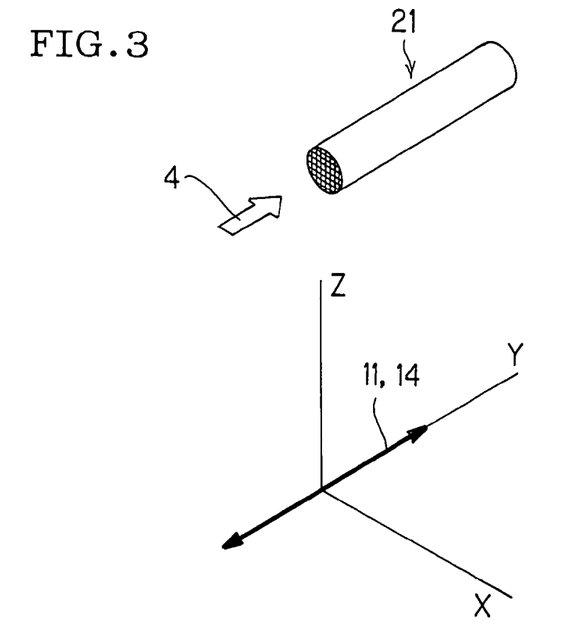
FIG. 3 is a schematic view showing one example of a conventional method for drying a ceramic formed body by hot air.

FIG. 3 shows an example of a conventional method as a reference. In the conventional method, the blowing direction 14 of hot air and the axial direction 11 of the through-holes are the same as Y-axis direction. Both the angle $\theta$ and the angle $\phi$ are 0 degree. In this case, the blowing direction and the axial direction are positioned so that most hot air 4 enters in the through-holes of the ceramic formed body 21 actively and directly. Incidentally, "actively and directly" means without changing the direction of hot air 4 by blowing against another substance, or the like between the ceramic formed body and an upstream of the hot air. The upstream of the hot air is, for example, a hot-air inlet of the drying room. Incidentally, the hot-air inlet is not illustrated.

On the other hand, in the embodiment shown in FIG. 4, even in the case that the angle $\theta$ is 45 degrees, half amount or more of the hot air 4 blows against the peripheral face. In addition, since the hot air 4 blows against an end face also at an angle of 45 degrees with respect to the axial direction 11 of the through-holes, the hot air 4 does not smoothly enter into the through-holes in comparison with the case that the angle $\theta$ is 0 degree. As the angle $\theta$ increases, the amount of the hot air 4 blowing against the peripheral face increases. For example, when the angle $\theta$ is nearly 90 degree, almost the whole amount of the hot air 4 blows against the peripheral face. That is, the hot air 4 is inhibited from actively and directly entering into the through-holes. Therefore, temperature inside through-holes is not lowered to the temperature lower than the gelling temperature due to vaporization cooling of moisture, and deformation of the ceramic formed body and generation of a crack or the like during firing are suppressed.

Figure 5:
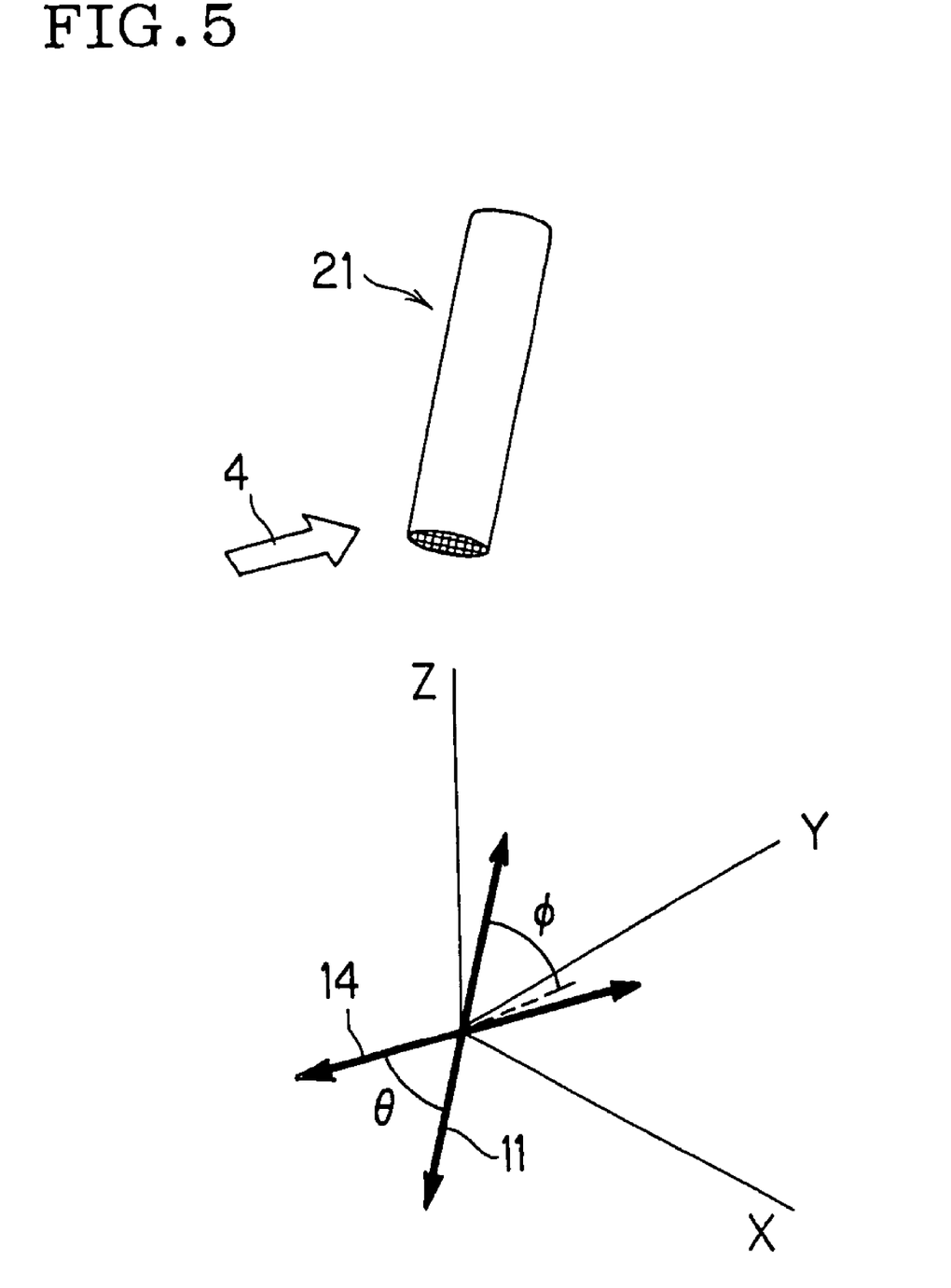
FIG. 5 is a schematic view showing one example of a method for drying a ceramic formed body by hot air of the present invention.

FIG. 5 shows a preferable embodiment of the first drying method of the present invention, in which the blowing direction 14 is present on the X-Y plane (parallel to the horizontal plane), the axial direction 11 of the through-holes forms the angle $\phi$ of 45 to 90 degree with the X-Y plane. In this case, the angle $\phi$ formed by the blowing direction 14 and the axial direction 11 of the through-holes is also within the range from 45 to 90 degrees. This embodiment exhibits a similar effect to that of the embodiment shown in FIG. 4.

Figure 6:
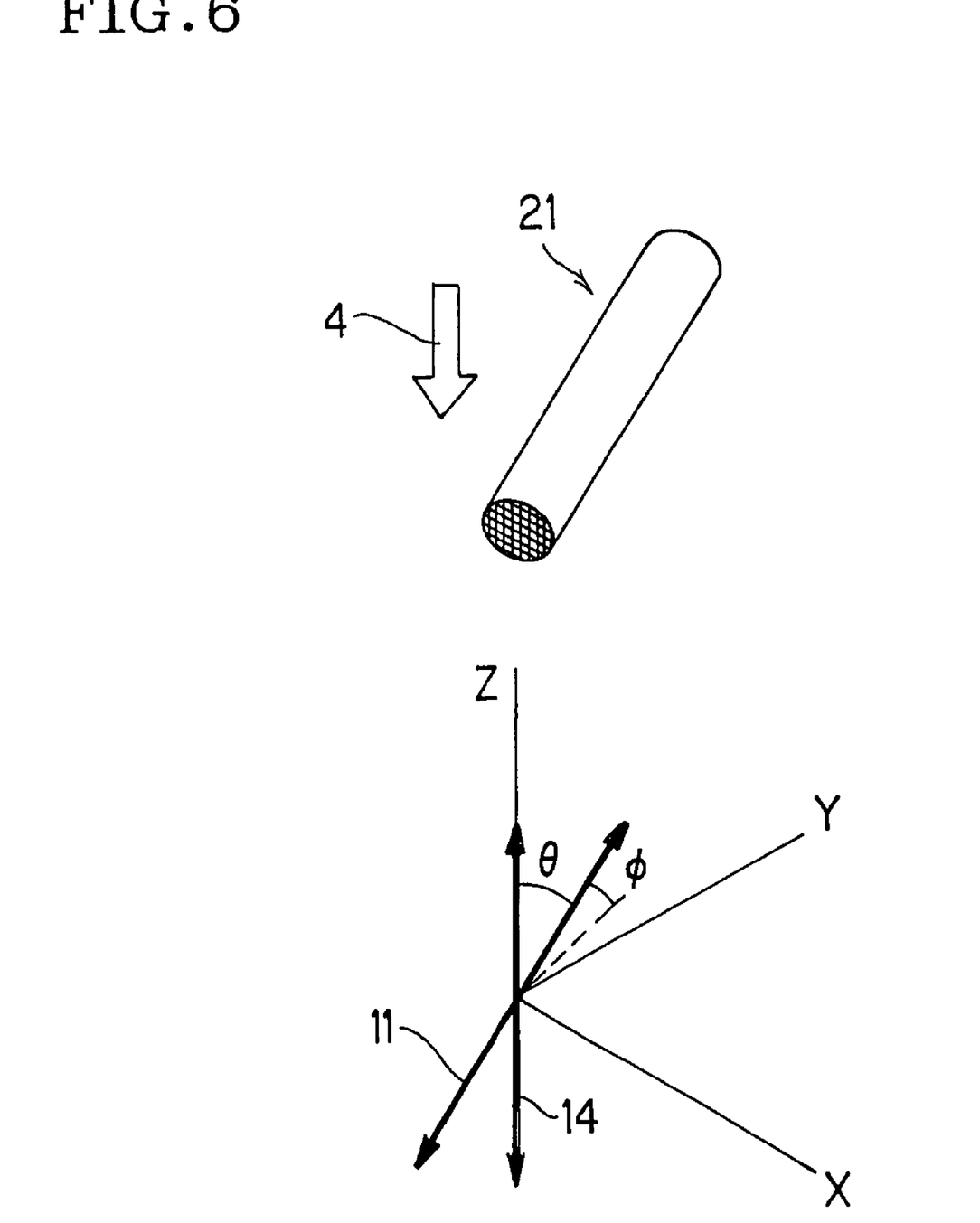
FIG. 6 is a schematic view showing one example of a method for drying a ceramic formed body by hot air of the present invention.

FIG. 6 shows a preferable embodiment of the first drying method of the present invention, in which the blowing direction 14 is perpendicular to the X-Y plane (the direction is the Z-axis direction as an example), the axial direction 11 of the through-holes forms the angle $\theta$ of 0 to 45 degree with the X-Y plane. In this case, the angle $\theta$ formed by the blowing direction 14 and the axial direction 11 of the through-holes is also within the range from 45 to 90 degrees. This embodiment exhibits a similar effect to that of the embodiment shown in FIG. 4.

Next, description is made on the case that the blowing direction and the axial direction of the through-holes form an angle of 90 degrees in the first drying method of the present invention, that is, a method in which the angle $\theta$ is 90 degrees. This angle is the angle formed by the blowing direction of hot air and the axial direction of through-holes on the same plane and limits neither the blowing direction of hot air nor the axial direction of through-holes (i.e., direction of the disposition of the ceramic formed body). Since the angle $\phi$ is 90 degrees, whatever degree the angle $\phi$ takes within the range from 0 to 90 degrees, almost the whole amount of hot air blows against the peripheral face, and hot air does not actively and directly entering into the through-holes. Therefore, temperature inside through-holes is not lowered to the temperature lower than the gelling temperature due to vaporization cooling of moisture, and deformation of the ceramic formed body and generation of a crack or the like during firing are suppressed.

Figure 7:
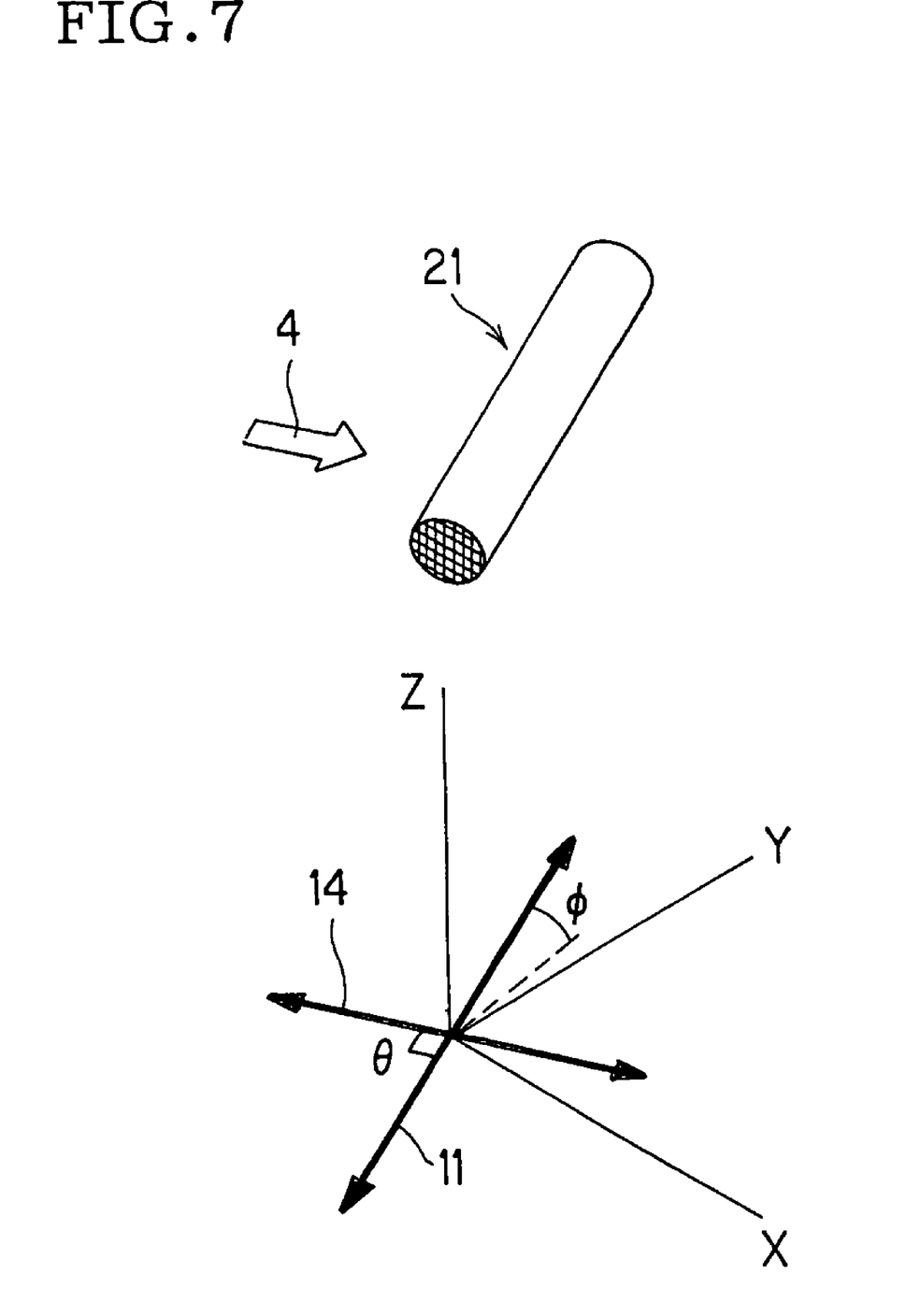
FIG. 7 is a schematic view showing one example of a method for drying a ceramic formed body by hot air of the present invention.

In the preferable embodiment shown in FIG. 7, the blowing direction 14 is present on the X-Y plane (parallel to the horizontal plane), and the ceramic formed body 21 is disposed so that the axial direction 11 of the through-holes forms an angle within the range from 0 to 90 degrees with respect to the X-Y plane. That is the angle $\phi$ is 0 to 90 degrees. In this case, the angle $\theta$ is expressed as an angle on the plane where both the blowing direction 14 of hot air and the axial direction 11 of the through-holes are present, and the angle $\phi$ is 90 degrees.

Figure 8:
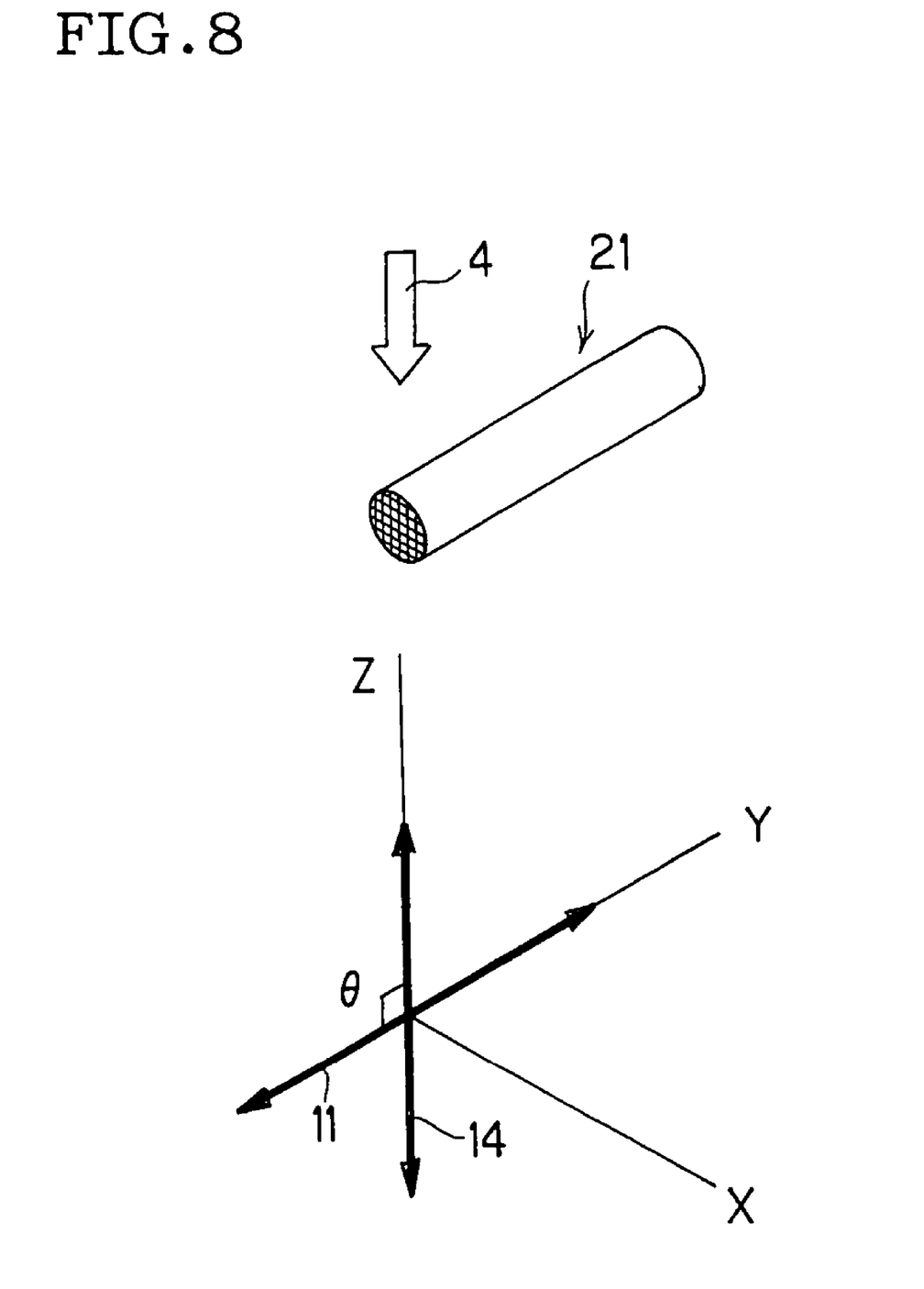
FIG. 8 is a schematic view showing one example of a method for drying a ceramic formed body by hot air of the present invention.
Figure 9:
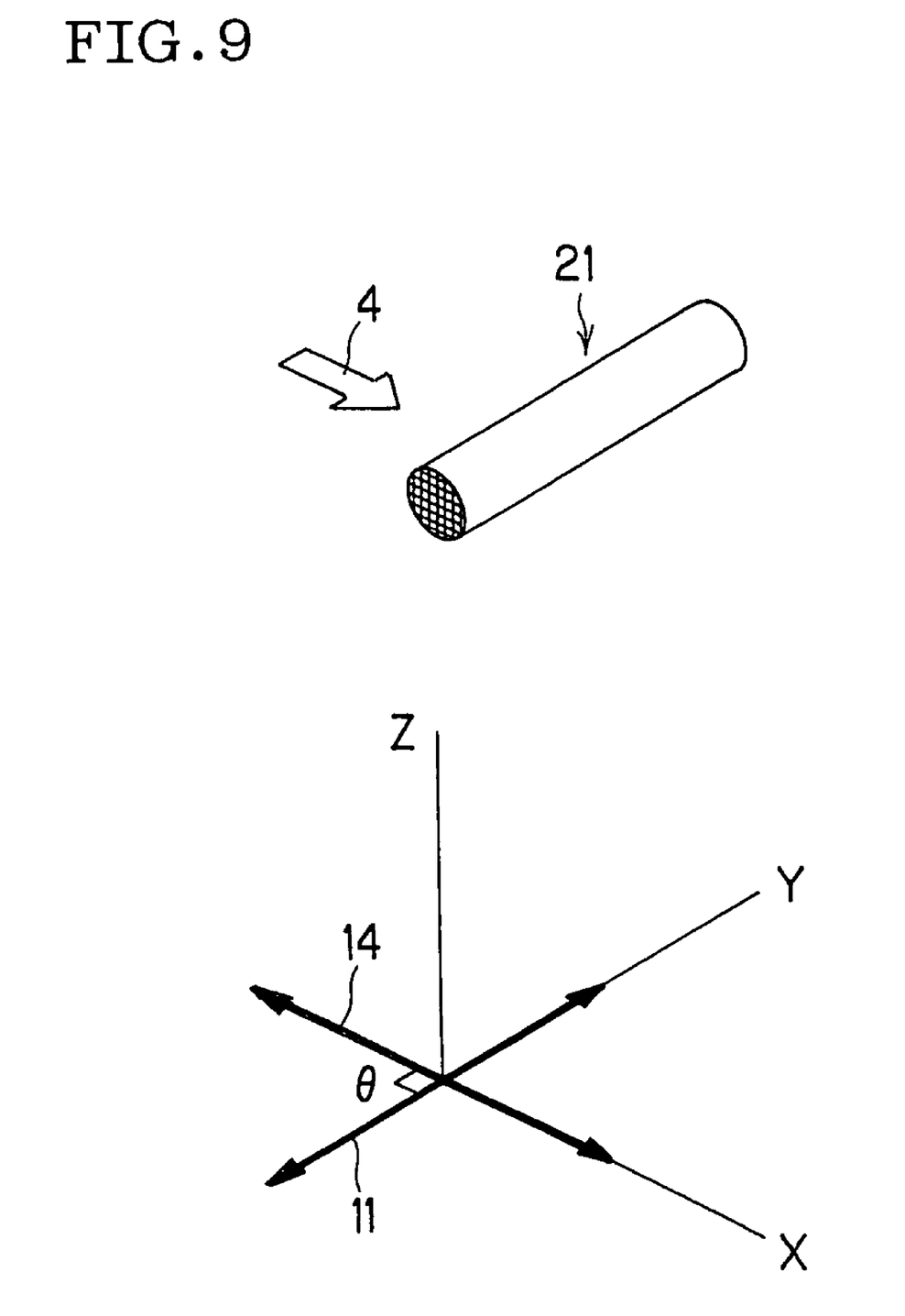
FIG. 9 is a schematic view showing one example of a method for drying a ceramic formed body by hot air of the present invention.

In the preferable embodiment shown in FIG. 8, the blowing direction 14 is perpendicular to the X-Y plane, and the ceramic formed body 21 is disposed so that the axial direction 11 of the through-holes is present on the X-Y plane (the direction is the Y-axis direction as an example). That is, the angle $\phi$ is 0 degree, and the angle $\theta$ is expressed as an angle on the Y-Z plane, where both the blowing direction 14 of hot air and the axial direction 11 of the through-holes are present, and is 90 degrees. Incidentally, the blowing direction 14 may be present on the X-Y plane (parallel to a horizontal plane) (see FIG. 9).

Figure 10:
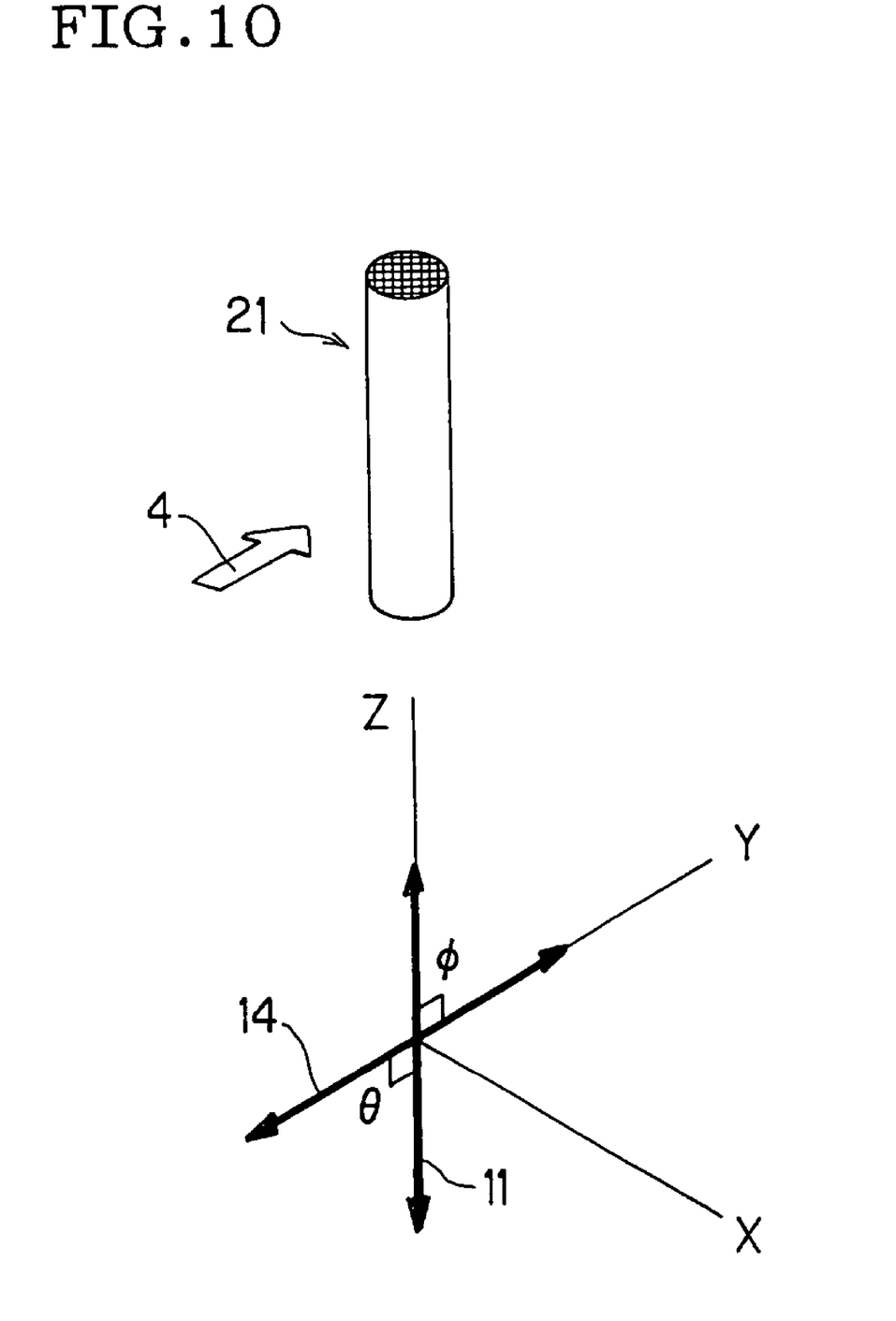
FIG. 10 is a schematic view showing one example of a method for drying a ceramic formed body by hot air of the present invention.

In the preferable embodiment shown in FIG. 10, the blowing direction 14 is present on the X-Y plane (the direction is the Y-axis direction as an example), and the ceramic formed body 21 is disposed so that the axial direction 11 of the through-holes is perpendicular to the X-Y plane (the direction is the Z-axis direction as an example). That is, the angle $\phi$ is 90 degrees, and the angle $\theta$ is expressed as an angle on the Y-Z plane, where both the blowing direction 14 of hot air and the axial direction 11 of the through-holes are present, and is 90 degrees.

Next, description is made on the second hot-air drying method of the present invention. In the second hot-air drying method of the present invention, a baffle plate is disposed between an end face having an opening of the through-hole and an upstream of the hot air. The upstream of the hot air is, for example, a hot-air inlet of a drying room in which the ceramic formed body is placed. By disposing a baffle plate, hot air does not actively and directly entering into the through-holes. Therefore, temperature inside through-holes is not lowered to the temperature lower than the gelling temperature due to vaporization cooling of moisture, and deformation of the ceramic formed body and generation of a crack or the like during firing are suppressed. Incidentally, the second hot-air drying method may be employed together with the first drying method.

Figure 11A:
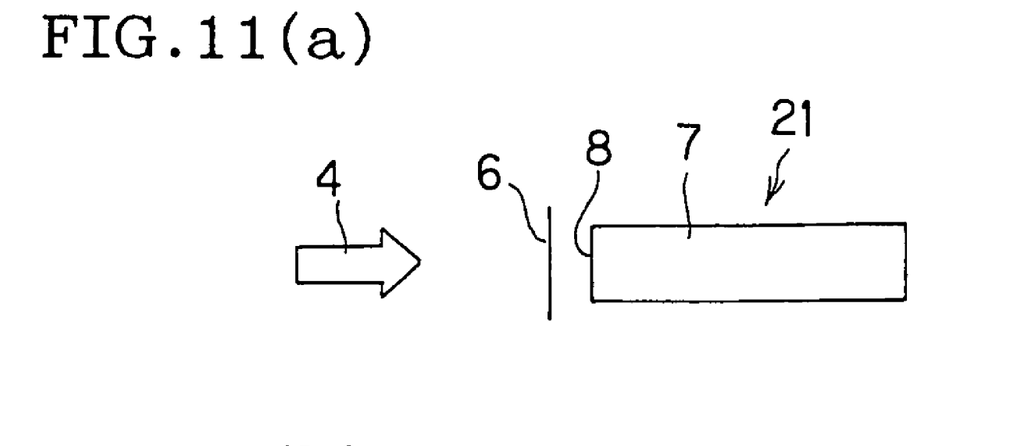
Figure 11B:
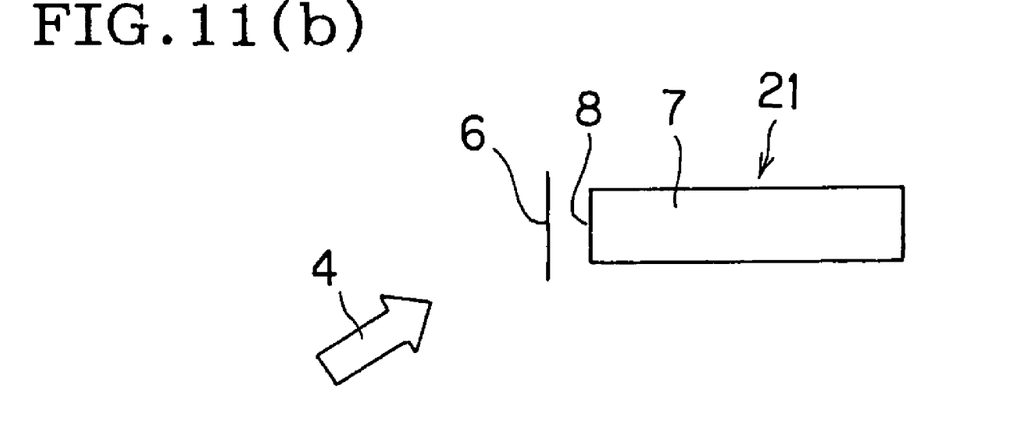
Figure 11C:
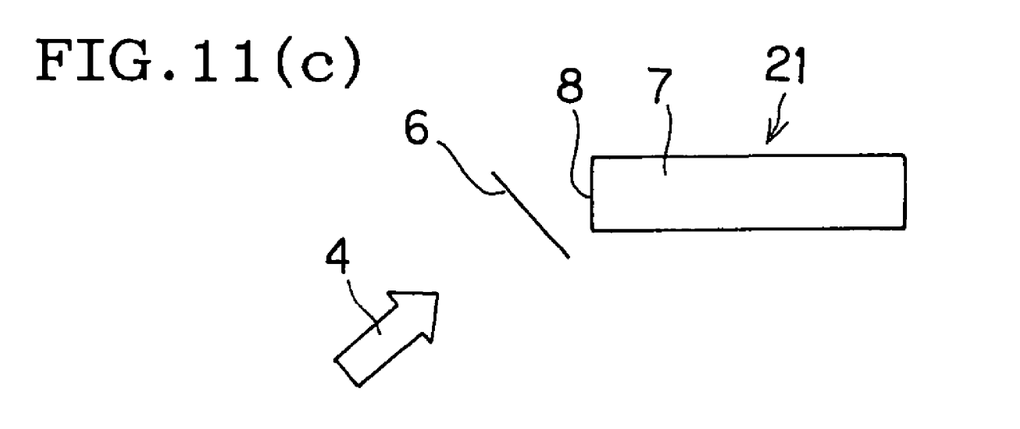

FIGS. 11(a), 11(b), and 11(c) are top views showing preferable embodiments of the second hot-air drying method of the present invention. In the preferable embodiment of the second hot-air drying method of the present invention shown in FIG. 11(a), the blowing direction of the hot air 4 is parallel to the axial direction of a through-hole of the ceramic formed body 21, and a baffle plate is disposed perpendicularly to the blowing direction of the hot air 4. In this embodiment, due to the presence of the baffle plate 6, the hot air 4 does not actively and directly entering into the through-holes open at the end face 8. Therefore, temperature inside through-holes is not lowered to the temperature lower than the gelling temperature due to vaporization cooling of moisture, and deformation of the ceramic formed body and generation of a crack or the like during firing are suppressed.

FIG. 11(b) shows a preferable embodiment of the second hot-air drying method of the present invention, in which the baffle plate 6 is disposed near the end face 8 of the ceramic formed body 21 so as to be in almost parallel with the end face 8, and the blowing direction of the hot air 4 and the axial direction of a through-hole of the ceramic formed body 21 forms a predetermined angle. Even if the angle formed by the blowing direction of the hot air 4 and the axial direction of a through-hole is smaller than 45 degrees, due to the presence of the baffle plate 6, the hot air 4 does not actively and directly entering into the through-holes open at the end face 8. Therefore, temperature inside through-holes is not lowered to the temperature lower than the gelling temperature due to vaporization cooling of moisture, and deformation of the ceramic formed body and generation of a crack or the like during firing are suppressed.

FIG. 11(c) shows a preferable embodiment of the second hot-air drying method of the present invention, in which the baffle plate 6 is disposed perpendicularly to the blowing direction of the hot air 4 in the embodiment shown in FIG. 11(b). Also in this case, the hot air 4 does not actively and directly entering into the through-holes open at the end face 8. Therefore, temperature inside through-holes is not lowered to the temperature lower than the gelling temperature due to vaporization cooling of moisture, and deformation of the ceramic formed body and generation of a crack or the like during firing are suppressed.

Heretofore, description has been made on embodiments of the present invention. Incidentally, a hot-air drying method of the present invention is aimed to inhibit temperature inside through-holes from being lowered to the temperature lower than the gelling temperature of a heat-gelling binder when unfired ceramic formed body is dried. However, this method may effectively employed in drying a ceramic formed body having at least one through-hole containing moisture after firing. In the case that a ceramic formed body having at least one through-hole containing moisture, when the ceramic formed body is disposed so that the blowing direction of hot air from a hot-air drier is in parallel with the axial direction of the through-hole, that is, so that the hot air smoothly passes though the through-holes, there is a possibility to have a crack in the ceramic formed body due to the difference in temperature between the inside of the through-hole where temperature is lowered due to vaporization cooling and the peripheral portion. However, according to a hot-air drying method of the present invention, apprehensions of such a trouble are unnecessary.

EXAMPLES

The present invention will be described hereinafter in more detail based on examples. However, the present invention is not limited to these examples.

(Production of Ceramic Formed Body)

Figure 12:
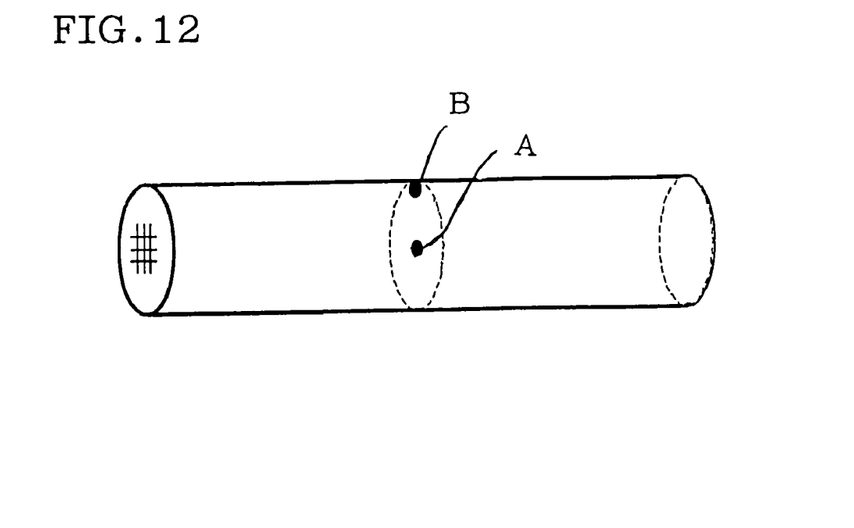
FIG. 12 is a perspective view showing a ceramic formed body obtained in Examples.

With alumina powder as a raw material were mixed methyl cellulose and hydroxypropoxyl methylcellulose as heat-gelling binders, and to the mixture were further added a surfactant and water to obtain clay having plasticity. The clay was subjected to extrusion to give a columnar ceramic formed body having a honeycomb structure (see FIG. 12). The columnar ceramic formed body had external dimensions of 180 mm in diameter of the end faces and 1000 mm in length of the through-holes. The partition walls have a thickness of 0.7 mm, and each through-hole separated from each other by the partition walls has a square section and a pitch of 3.3 mm. Incidentally, gelling temperature of the heat-gelling binders is about 38 degrees C.

Example 1

Figure 15:
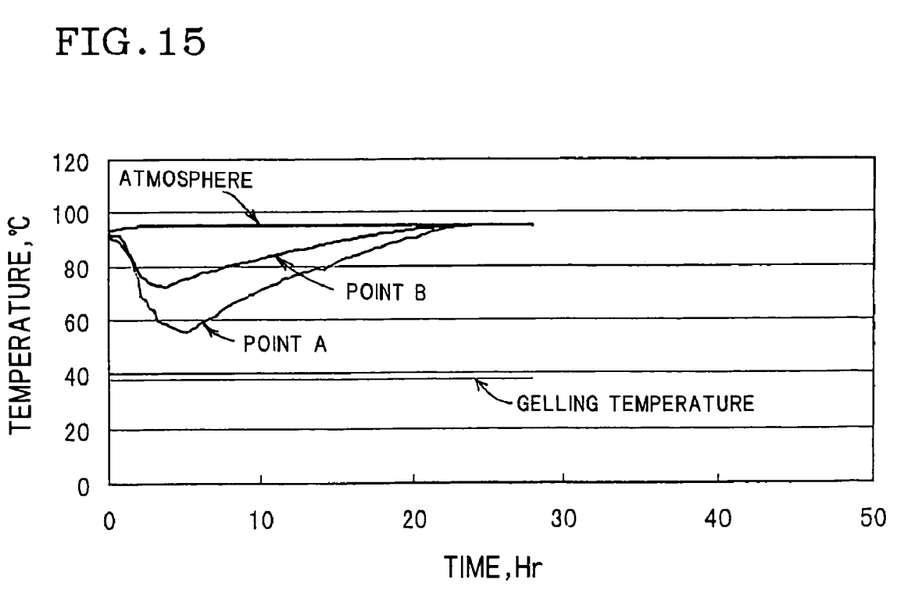
FIG. 15 is a graph showing the result of the Example.

The obtained ceramic formed body was subjected to dielectric drying and then hot air drying until it was completely dried. In the hot air drying, hot air was blown against the ceramic formed body at an angle of 45 degrees with respect to the axial direction of the through-holes from the horizontal direction (in parallel with the horizontal plane). As the hot air source, a hot air drier (SK-150 manufactured by SHIMAKAWA SEISAKUSYO Co., Ltd. The temperature of the hot air was 95 degrees C., and the velocity of the hot air was 1 m/sec. In drying, a 0.5-diameter sheath K thermocouple was set at the point A, which is the center of the section, and the point B, which is near the peripheral face, and a point outside the ceramic formed body (in atmosphere) to measure temperature at each of the points during drying. FIG. 15 shows temperature change at each of the points A and B and in atmosphere during drying together with the gelling temperature. In addition, the ceramic formed body was evaluated for the deformation after the drying. To be concrete, the external diameter was measured to give the evaluation of "good" (no deformation) when the difference between the longer diameter and the shorter diameter is less than 5 mm or "bad" (some deformation) when the difference between the longer diameter and the shorter diameter is 5 mm or more. The results are shown in Table 1.

TABLE 1

|  | deformation |
|---|---|
| Example 1 | Good |
| Example 2 | Good |
| Example 3 | Good |
| Example 4 | Good |
| Example 5 | Good |
| Comparative Example 1 | Bad |
| Comparative Example 2 | Bad |

As clearly shown in FIG. 15, though it takes some time for the temperatures of the points A and B to coincide with the temperature of atmosphere, the temperatures at the points A and B were higher than the gelling temperature. In addition, as shown in Table 1, the ceramic formed body had almost no deformation after the drying.

Example 2

Figure 16:
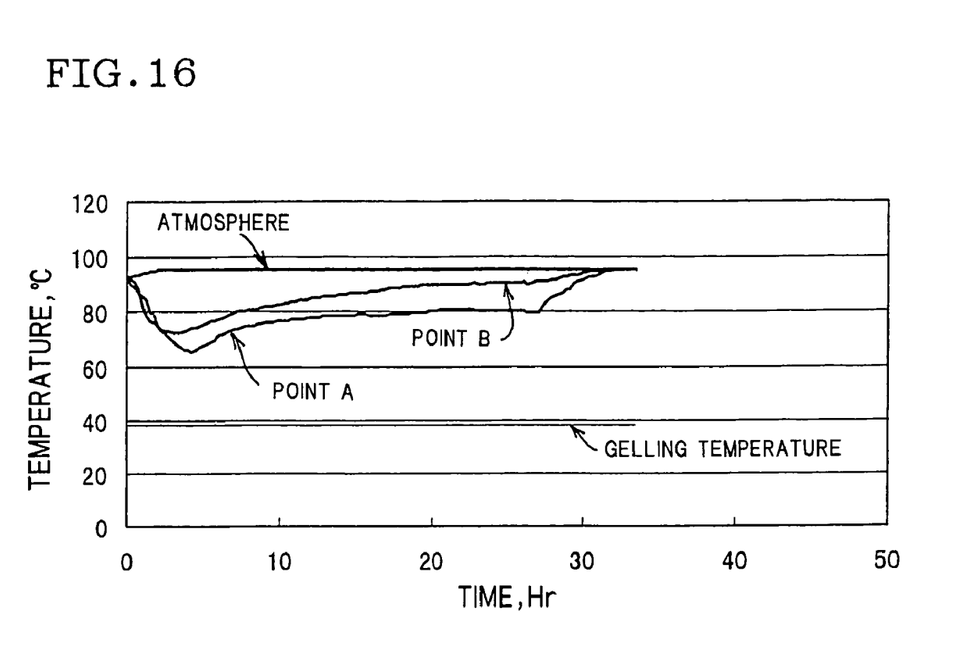
FIG. 16 is a graph showing the result of the Example.

Drying was conducted in the same manner as in Example 1 except that hot air was blown against the ceramic formed body so as to form an angle of 60 degrees to the axial direction of the through-holes from the horizontal direction (in parallel with the horizontal plane), and temperature was measured during drying. The results are shown in FIG. 16. In addition, the ceramic formed body was evaluated for the deformation after the drying using the same criteria as in Example 1. The results are shown in Table 1.

As clearly shown in FIG. 16, the temperatures at the points A and B were higher than the gelling temperature, and it was confirmed that decrease in temperature was further suppressed at both the points A and B in comparison with the results of the Example 1. As shown in Table 1, the ceramic formed body had almost no deformation after the drying.

Example 3

Figure 17:
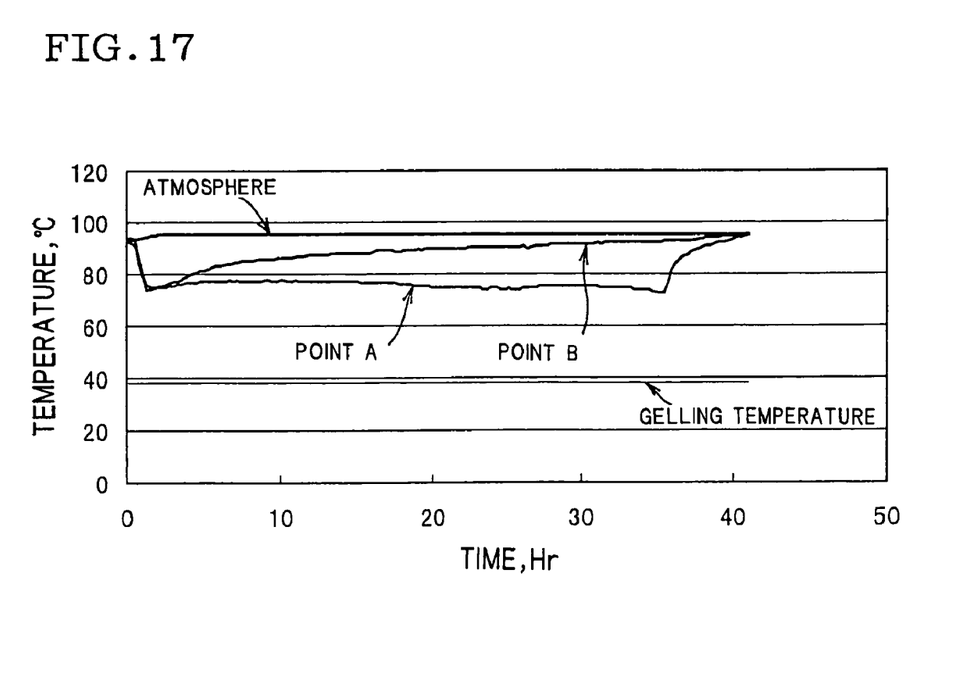
FIG. 17 is a graph showing the result of the Example.

Drying was conducted in the same manner as in Example 1 except that hot air was blown against the ceramic formed body so as to form an angle of 90 degrees to the axial direction of the through-holes from the horizontal direction (in parallel with the horizontal plane), and temperature was measured during drying. The results are shown in FIG. 17. In addition, the ceramic formed body was evaluated for the deformation after the drying using the same criteria as in Example 1. The results are shown in Table 1.

As shown in FIG. 17, the temperatures at the points A and B were higher than the gelling temperature, and it was confirmed that decrease in temperature was further suppressed at both the points A and B in comparison with the results of the Examples 1 and 2. As shown in table 1, the ceramic formed body had almost no deformation after the drying. From the results of Examples 1, 2, and 3, it can be understood that an angle formed by the blowing direction of hot air and the axial direction of through-hole(s) of a ceramic formed body is important when the ceramic formed body is dried.

Comparative Example 1

Figure 13:
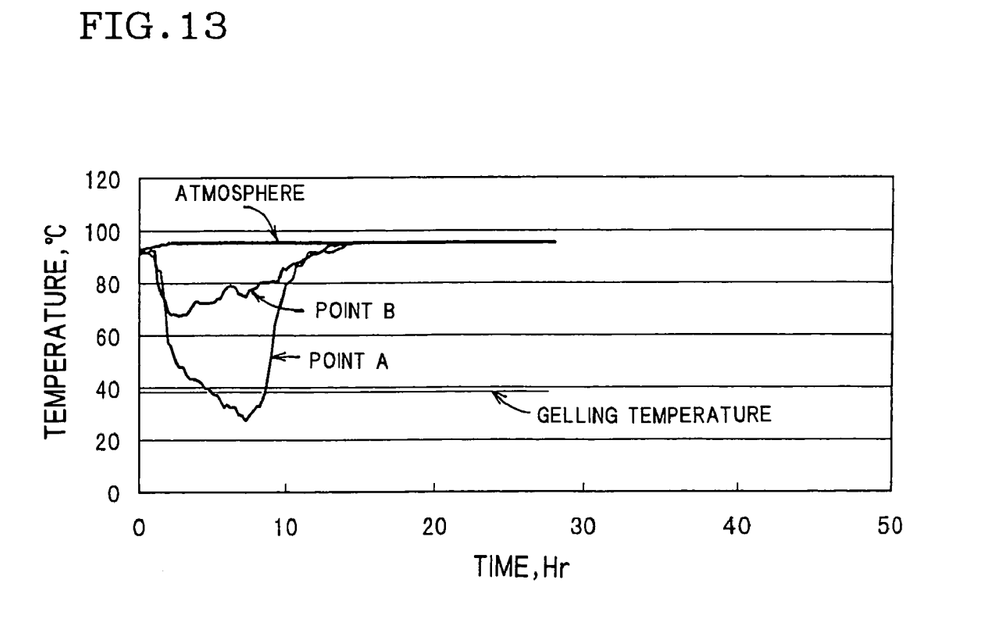
FIG. 13 is a graph showing the result of the Comparative Example.

Drying was conducted in the same manner as in Example 1 except that hot air was blown against the ceramic formed body in parallel (to form an angle of 0 degree) to the axial direction of the through-holes from the horizontal direction (in parallel with the horizontal plane), and temperature was measured during drying. The results are shown in FIG. 13. In addition, the ceramic formed body was evaluated for the deformation after the drying using the same criteria as in Example 1. The results are shown in Table 1.

As clearly shown in FIG. 13, though it takes less time for the temperatures of the points A and B to coincide with the temperature of atmosphere, the temperature at the point A was temporarily lower than the gelling temperature. In addition, as shown in Table 1, the ceramic formed body had deformation after the drying.

Comparative Example 2

Figure 14:
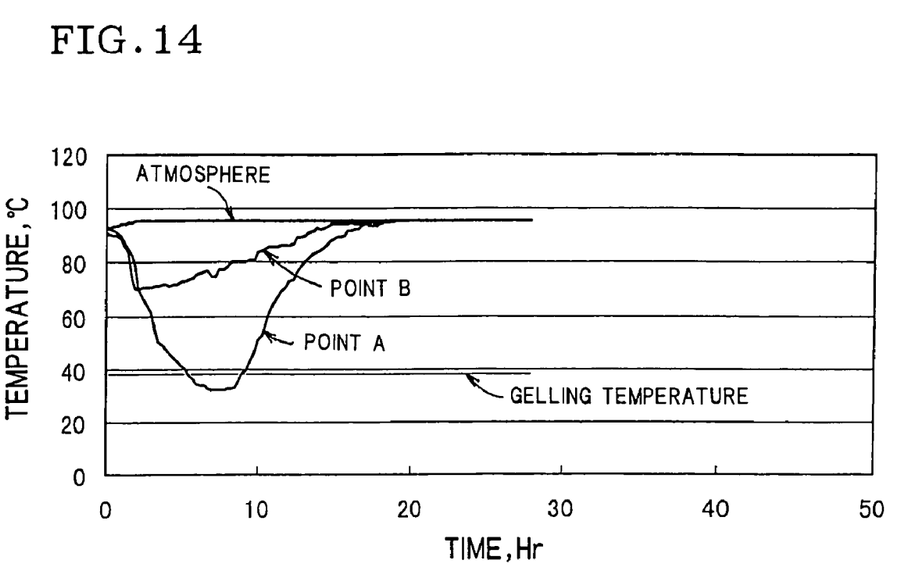
FIG. 14 is a graph showing the result of the Comparative Example.

Drying was conducted in the same manner as in Example 1 except that hot air was blown against the ceramic formed body so as to form an angle of 30 degrees to the axial direction of the through-holes from the horizontal direction (in parallel with the horizontal plane), and temperature was measured during drying. The results are shown in FIG. 14. In addition, the ceramic formed body was evaluated for the deformation after the drying using the same criteria as in Example 1. The results are shown in Table 1.

As shown in FIG. 14, the temperature at the point A was temporarily lower than the gelling temperature. In addition, as shown in table 1, the ceramic formed body had deformation after the drying.

Example 4

Figure 18:
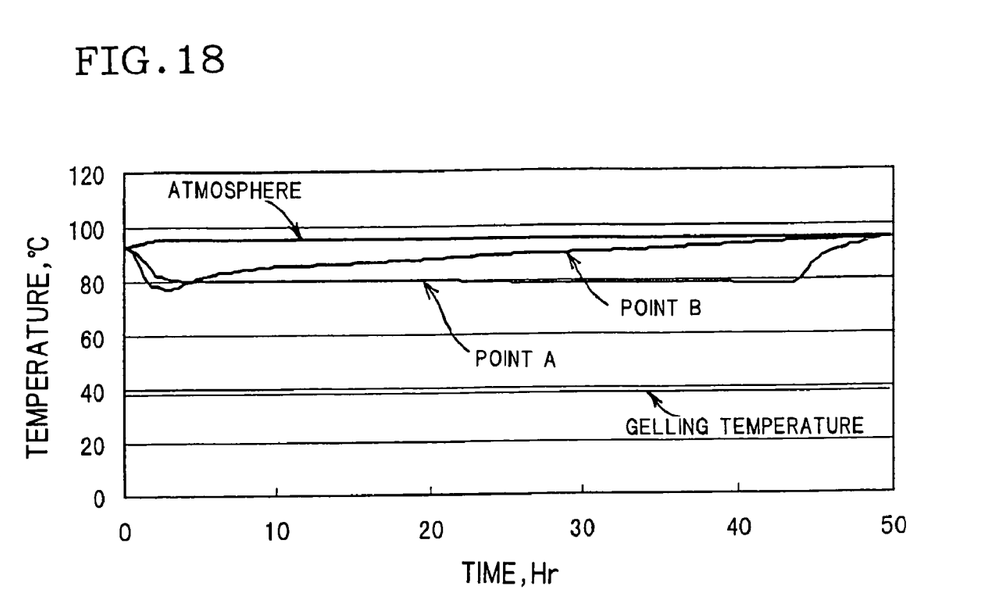
FIG. 18 is a graph showing the result of the Example.

Drying was conducted in the same manner as in Example 1 except that a ceramic formed body was disposed horizontally (in parallel to a horizontal plane), that a baffle plate having dimensions of 200×200 mm was disposed at a place 10 mm away from an end face of the ceramic formed body so as to be perpendicular to the direction of the hot air, and that hot air was blown against the ceramic formed body in parallel (to form an angle of 0 degree) to the axial direction of the through-holes from the horizontal direction (in parallel with the horizontal plane), and temperature was measured during drying. The results are shown in FIG. 18. In addition, the ceramic formed body was evaluated for the deformation after the drying using the same criteria as in Example 1. The results are shown in Table 1.

As clearly shown in FIG. 18, though it takes longer time for the temperatures of the points A and B to coincide with the temperature of atmosphere in comparison with Example 1, the temperatures at the points A and B were higher than the gelling temperature, and further, decrease in temperature in each of the points A and B was smallest. As shown in table 1, the ceramic formed body had almost no deformation after the drying.

Example 5

Figure 19:
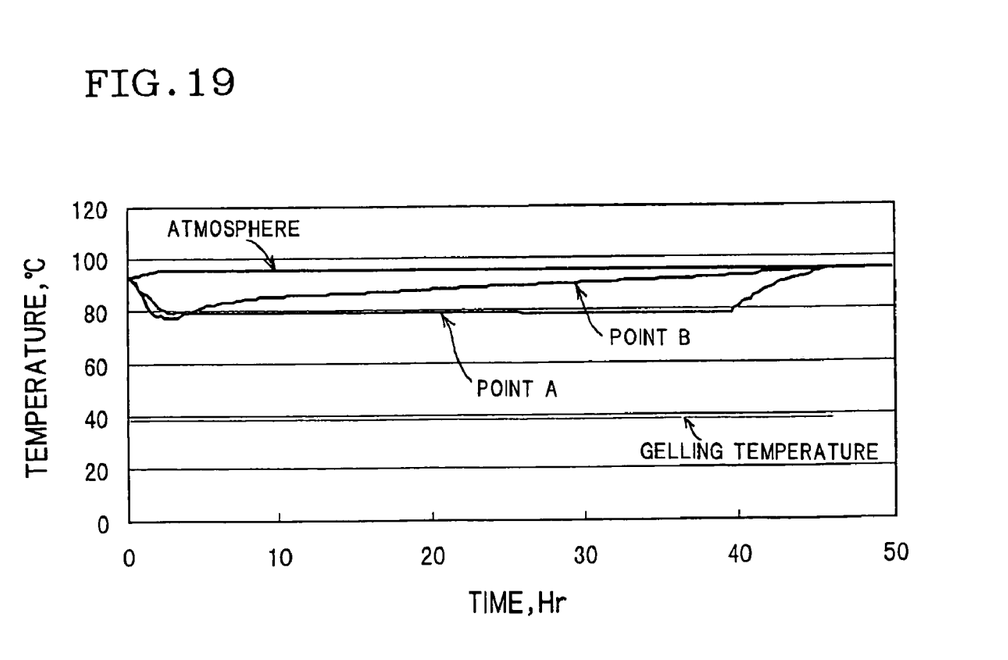
FIG. 19 is a graph showing the result of the Example.

Drying was conducted in the same manner as in Example 4 except that hot air was blown against the ceramic formed body so as to form an angle of 30 degrees to the axial direction of the through-holes from the horizontal direction (in parallel with the horizontal plane), and temperature was measured during drying. The results are shown in FIG. 19. In addition, the ceramic formed body was evaluated for the deformation after the drying using the same criteria as in Example 1. The results are shown in Table 1.

As clearly shown in FIG. 19, though it takes long time for the temperatures of the points A and B to coincide with the temperature of atmosphere, the temperatures at the points A and B were higher than the gelling temperature, and further, decrease in temperature in each of the points A and B was smallest. As shown in Table 1, the ceramic formed body had almost no deformation after the drying.

A hot-air drying method of a ceramic formed body of the present invention can suitably be used as a means for drying a ceramic formed body having at least one through-hole as follows. Ceramic formed bodies to be dried are suitably employed as catalyst carriers or various kinds of filters in the field of, for example, an exhaust-gas treatment, or as various kinds of filters for removal of suspended matter, bacteria, dust, or the like, present in liquid or gas in the fields of a water treatment, pharmaceuticals, food, and the like. Representative structures of such ceramic formed bodies include a honeycomb structure, a monolithic structure, and a tube structure.

What is claimed is:

1. A method for drying a ceramic formed body by hot air;
   the formed body having a peripheral face and end faces constituting a columnar shape, and at least one through-hole extending in an axial direction and open at the end face,
   the formed body containing ceramics and a heat-gelling binder,
   wherein the hot air is blown to the formed body in a direction at an angle of 45 to 90 degrees with respect to the axial direction.

2. The method for drying a ceramic formed body by hot air according to claim 1, wherein the direction of the hot air is parallel to a horizontal plane, and the ceramic formed body is disposed so that the axial direction of the through-hole is parallel to the horizontal plane.

3. The method for drying a ceramic formed body by hot air according to claim 1, wherein the direction of the hot air is parallel to a horizontal plane, and the ceramic formed body is disposed so that the axial direction of the through-hole is at an angle of 45 to 90 degrees with respect to the horizontal plane.

4. The method for drying a ceramic formed body by hot air according to claim 1, wherein the direction of the hot air is perpendicular to a horizontal plane, and the ceramic formed body is disposed so that the axial direction of the through-hole is at an angle of 0 to 45 degrees with respect to the horizontal plane.

5. The method for drying a ceramic formed body by hot air according to claim 1, wherein the direction of the hot air is at an angle of 90 degrees with respect to the axial direction of the through-hole.

6. The method for drying a ceramic formed body by hot air according to claim 5, wherein the direction of the hot air is parallel to a horizontal plane, and the ceramic formed body is disposed so that the axial direction of the through-hole is at an angle of 0 to 90 degrees with respect to the horizontal plane.

7. The method for drying a ceramic formed body by hot air according to claim 5, wherein the direction of the hot air is parallel or perpendicular to a horizontal plane, and the ceramic formed body is disposed so that the axial direction of the through-hole is parallel to the horizontal plane.

8. The method for drying a ceramic formed body by hot air according to claim 5, wherein the direction of the hot air is parallel to a horizontal plane, and the ceramic formed body is disposed so that the axial direction of the through-hole is perpendicular to the horizontal plane.

9. A method for drying a ceramic formed body by hot air:
   the formed body having a peripheral face and end faces constituting a columnar shape, and at least one through-hole extending in an axial direction and open at the end face,
   the formed body containing ceramics and a heat-gelling binder,
   wherein a baffle plate is disposed between an upstream of the hot air and the end face having an opening of the through-hole.

10. The method for drying a ceramic formed body by hot air according to claim 9, wherein the direction of the hot air is parallel to the axial direction of the through-hole.

* * * * *